United States Patent [19]

Yokoi

[11] Patent Number: 5,757,934
[45] Date of Patent: May 26, 1998

[54] TRANSMITTING/RECEIVING APPARATUS AND COMMUNICATION SYSTEM USING THE SAME

[75] Inventor: Masamichi Yokoi, Ibaraki, Japan

[73] Assignee: Yokoi Plan Co., Ltd., Ibaraki, Japan

[21] Appl. No.: 630,899

[22] Filed: Apr. 4, 1996

[30] Foreign Application Priority Data

Dec. 20, 1995 [JP] Japan .................. 7-349906

[51] Int. Cl.$^6$ ........................................ H04R 25/00
[52] U.S. Cl. ................ 381/68.3; 381/151; 379/430
[58] Field of Search .................. 381/68, 68.3, 23.1, 381/68.6, 151, 25, 183, 187, 72, 74; 379/52, 430; 600/25; 607/55, 137

[56] References Cited

U.S. PATENT DOCUMENTS

| | | | |
|---|---|---|---|
| 3,665,514 | 5/1972 | Durand | 2/420 |
| 4,588,867 | 5/1986 | Konomi | 381/151 |
| 5,280,524 | 1/1994 | Norris | 381/187 |
| 5,295,193 | 3/1994 | Ono | 381/151 |

*Primary Examiner*—Huyen D. Le
*Attorney, Agent, or Firm*—Oblon, Spivak, McClelland, Maier & Neustadt, P.C.

[57] ABSTRACT

A transmitting/receiving apparatus to be used as fitted into an external auditory meatus is provided which ensures less inclusion of noise and less possibility of howling and allows the user to hear the voice of the communication partner clearly, and which comprises: a bone-conduction microphone (2) and a speaker (3) which are housed in a single casing (4), the casing (4) having a distal end portion to assume a distal position in the external auditory meatus, in which distal end portion the bone-conduction microphone (2) is disposed; a vibration-absorptive foamed material (6) surrounding the bone-conduction microphone (2); a hollow portion (2) provided between the foamed material (7) and the speaker (3) within the casing (4); and a through-hole (8) extending through a wall portion of the casing (4) at a location adjacent the distal end portion.

14 Claims, 7 Drawing Sheets

TRANSMITTING/RECEIVING APPARATUS AND COMMUNICATION SYSTEM USING THE SAME

BACKGROUND OF THE INVENTION

1. Field of the Invention

The present invention relates to transmitting/receiving apparatus to b used as fitted into one ear and to communication systems using the apparatus.

2. Description of Related Art

Bone-conduction microphones are known to pick up voice signals from user's external auditory meatus wall through bone conduction and convert such signals into electric signals. Such bone-conduction microphones enable even persons handicapped in their vocal cords to enjoy conversation and hence are used as vocalization aids and the like.

Figure 10:
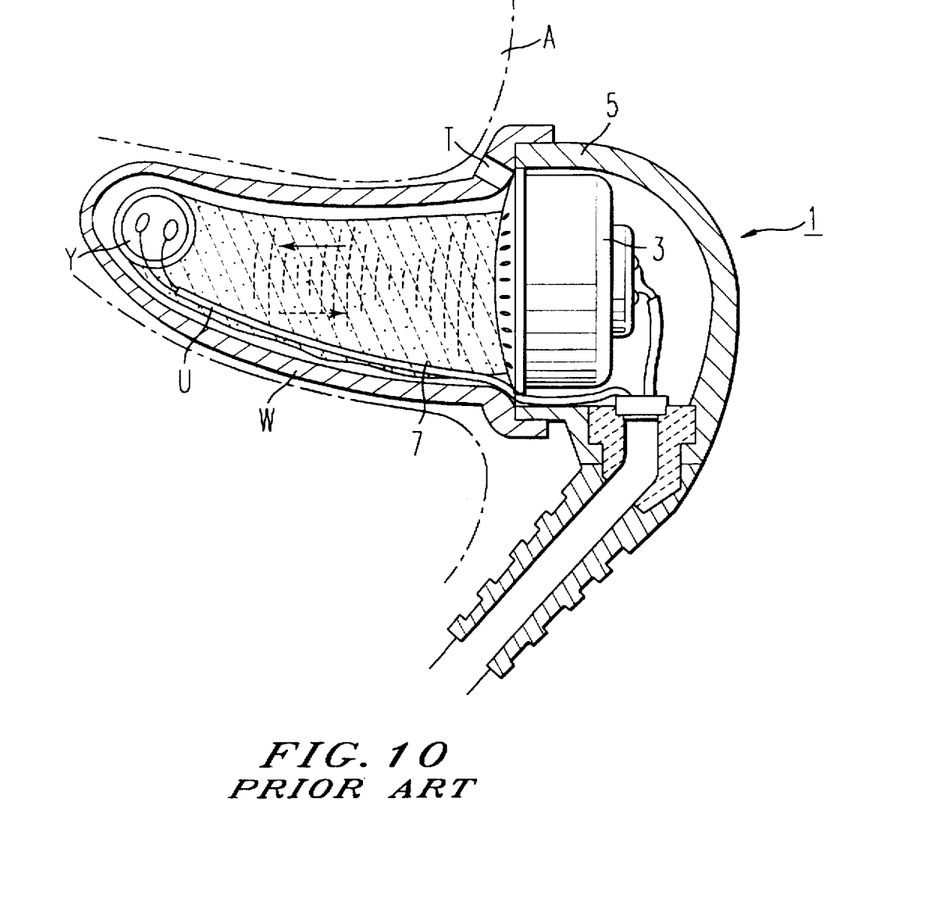
FIG. 10 is a schematic view showing the construction of a conventional transmitting/receiving apparatus.

Shown in FIG. 10 is a conventional transmitting/receiving apparatus (Z) as fitted into a user's external ear (A), including a speaker (X) and a bone-conduction microphone (Y) which are accommodated in a single casing. A resin mass (U) such as silicone is filled between the speaker (X) and the bone-conduction microphone (Y) to render the microphone (Y) stationary and prevent air vibration generated by the speaker (X) from being directly transmitted to the microphone (Y).

Casing (W) has a through-hole (T) adjacent the speaker (X) for conducting therethrough voice from the speaker (X) toward the depth of the external auditory meatus through the clearance between the casing (W) and the external auditory meatus wall.

With the above arrangement, however, vibration from the speaker (X) is partially transmitted to the bone-conduction microphone (Y) through the resin mass (U) undesirably, so that the bone-conduction microphone (Y) receives the unwanted vibration. This results in inclusion of noise into transmitted voice, echo or howling.

Further, since the through-hole (T) is formed at such a portion as to be positioned inside but adjacent the entrance of the external auditory meatus or outside the same and since the clearance between the casing (W) and the external auditory meatus wall is narrow, the voice transmitted through the through-hole to the outside of the casing (W) mostly escapes outwardly from the entrance of the external auditory meatus without being transmitted toward the depth of the external auditory meatus.

Furthermore, most of the voice from the speaker (X) is directed toward the resin mass (U) and, hence, a small amount of voice passes through the through-hole (T).

Consequently, the user hears low, indistinct and hard-to-hear voice.

To solve these problems, there has been proposed an apparatus including a bone-conduction microphone and a speaker which are respectively housed in two separate casings, one to be fitted into the external auditory meatus of the right ear, the other to be fitted into that of the left ear. In this case, however, both of the ears are plugged with the bone-conduction microphone and the speaker, so that the user becomes incapable of hearing external sounds together with the voice from the speaker. Additionally, fitting the bone-conduction microphone and the speaker into respective ears provides the user with a poor appearance and unhandiness.

It is, therefore, an object of the present invention to provide a transmitting/receiving apparatus which includes a bone-conduction microphone and a speaker, both housed in a single casing and which hardly allows inclusion of noise into transmitted voice and occurrence of howling.

SUMMARY OF THE INVENTION

According to one aspect of the present invention, there is provided a transmitting/receiving apparatus to be used as fitted into an external auditory meatus comprising: a bone-conduction microphone and a speaker which are housed in a single casing, the casing having a distal end portion to assume a distal position in the external auditory meatus, in which distal end portion the bone-conduction microphone is disposed: a vibration-absorptive foamed material surrounding the bone-conduction microphone; a hollow portion provided between the foamed material and the speaker within the casing; and a through-hole extending through a wall portion of the casing at a location adjacent the distal end portion.

In the transmitting/receiving apparatus the casing may be provided with a step portion which makes the distal end portion thinner than the rest and which defines the through-hole.

According to another aspect of the present invention, there is provided a transmitting/receiving apparatus to be used as fitted into an external auditory meatus comprising: a bone-conduction microphone and a speaker which are housed in a single casing, the casing having a distal end portion to assume a distal position in the external auditory meatus, in which distal end portion the bone-conduction microphone is disposed; a vibration-absorptive foamed material surrounding the bone-conduction microphone; a hollow portion provided between the foamed material and the speaker within the casing; a first through-hole extending through a wall portion of the casing within a range coincident with the hollow portion at a location adjacent the distal end portion; a second through-hole extending through a wall portion of the casing within the range coincident with the hollow portion at a location adjacent the speaker; and a groove portion formed in an outer surface of the casing between the first and second through-holes.

The transmitting/receiving apparatus according to each of the aspects of the present invention may further comprises a sound insulating member disposed between the hollow portion and the foamed material.

These features of the transmitting/receiving apparatus make the bone-conduction microphone little susceptible to voice from the speaker, thereby suppressing inclusion of noise into transmitted voice and howling. Further, the user can hear clear voice of the communication partner since the voice from the speaker is directed through the hollow portion and through-hole to the outside of the casing and then to the depth of the external auditory meatus.

According to further aspect of the present invention, there is provided a communication system comprising the transmitting/receiving apparatus according to each of the foregoing aspects.

By virtue of the transmitting/receiving apparatus, the communication system of the present invention ensures clear conversation. Unlike a conventional communication system, the communication system of the present invention dispenses with a receiving unit incorporating a microphone and speaker requiring limited mounting positions and hence is significantly reduced in size. The communication system becomes more convenient in use if the transmitting/receiving apparatus and the main body of the communication system are interconnected in a wireless fashion.

3

The foregoing and other object, features and attendant advantages will become apparent from the reading of the following detailed description taken in conjunction with the attached drawings.

DETAILED DESCRIPTION OF THE PREFERRED EMBODIMENTS

The present invention will now be described in detail by way of the preferred embodiments.

Embodiment 1

Figure 1:
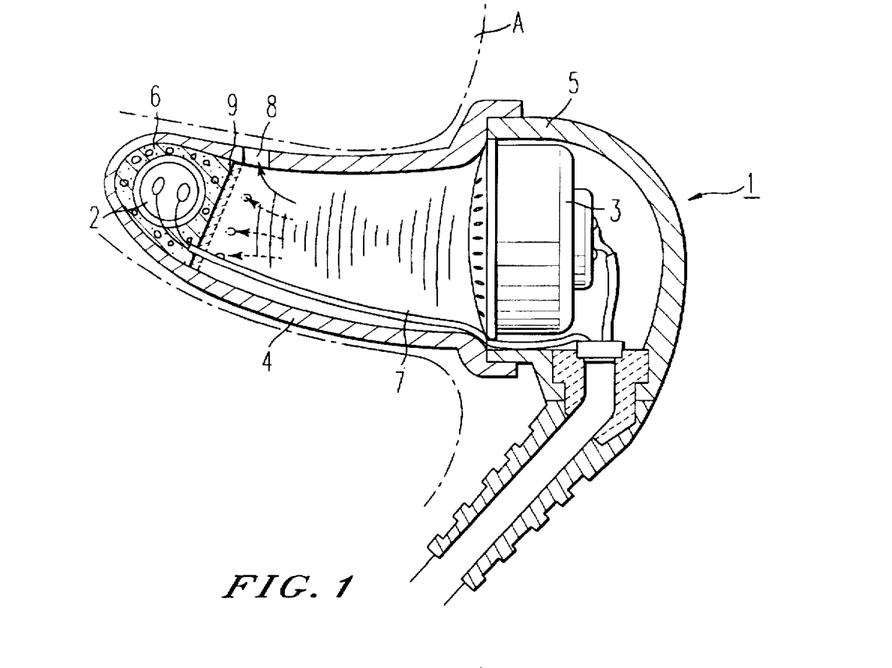
FIG. 1 is a schematic view showing the construction of a transmitting/receiving apparatus according to Embodiment 1 of the present invention.

Referring to FIG. 1, a transmitting/receiving apparatus (1) includes a casing comprising a base casing member (5) holding a speaker (3) therein and a distal casing member (4) to be fitted into an external auditory meatus.

The distal casing member (4) has a distal end portion in which a bone-conduction microphone is disposed and completely surrounded by and embedded within a mass of vibration-absorptive foamed material (6). The foamed material (6) exists only in the distal end portion, and the distal casing member (4) has a hollow portion (7) on the side adjacent the base casing member (5). In the present embodiment a partition made of a rubber of low resilience is provided between the foamed material (6) and the hollow portion (7) to serve as a sound insulating member (9).

The distal casing member (4) has a through-hole (8) in a wall portion defining the hollow portion (7) at a location adjacent the distal end portion for providing communication between the outside of the casing and the hollow portion. The through-hole (8) may be formed at either one or plural portions of the distal casing member (4).

4

When the user speaks, the bone-conduction microphone (2) picks up voice signals from the external auditory meatus wall through bone-conduction, converts them into electric signals and transmit the thus converted signals to a unit (such as a telephone apparatus) connected to the transmitting/receiving apparatus (1).

Voice generated from the speaker (3) advances in the hollow portion (7) in the form of air vibration toward the distal end portion of the distal casing member (4). However, the foamed material (6) present in the distal end portion absorbs and attenuates the vibration to such a degree that the bone-conduction microphone (2) is incapable of picking it up. Therefore, the bone-conduction microphone (2) is influenced little by voice from the speaker (3). The provision of the sound insulating member (9) between the hollow portion (7) and the foamed material (6) further enhances such a voice insulating effect.

Voice transmitted in the hollow portion (7), other than absorbed by the foamed material, is transmitted to the clearance between the distal casing member (4) and the external auditory meatus wall through the through-hole (8). Unlike a conventional transmitting/receiving apparatus, the apparatus of the present embodiment has the through-hole (8) adapted to be positioned deeper from the entrance of the external auditory meatus. Consequently, voice passing through the through-hole (8) is directed toward the depth of the external auditory meatus with less possibility of escaping to the outside of the entrance of the external auditory meatus. This allows the user to hear clear voice from the speaker (3).

Embodiment 2

Figure 2:
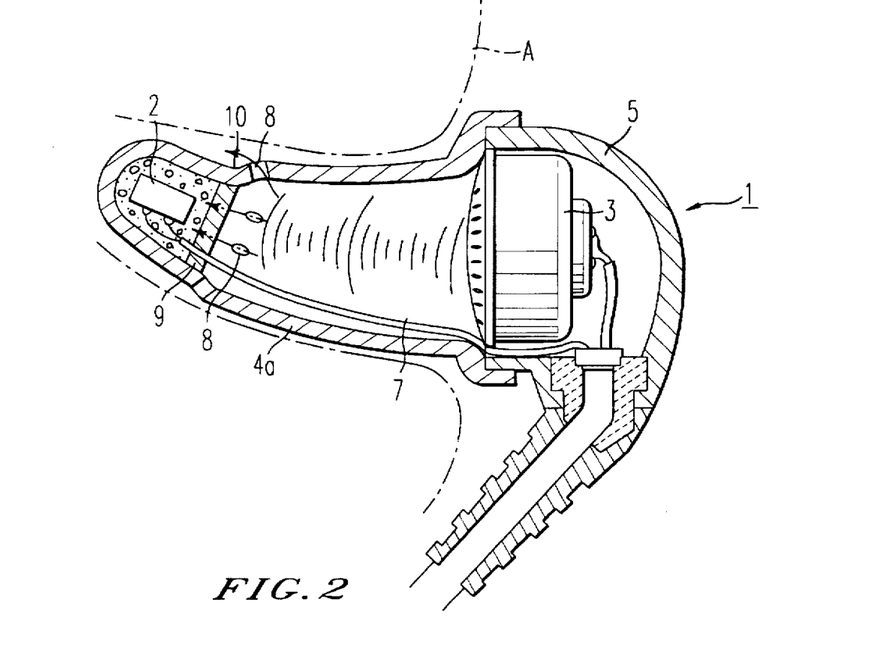
FIG. 2 is a schematic view showing the construction of a transmitting/receiving apparatus according to Embodiment 2 of the present invention.

FIG. 2 is a schematic sectional view showing the construction of a transmitting/receiving apparatus according to Embodiment 2 of the present invention. The construction of this embodiment is basically the same as that of Embodiment 1 except that distal casing member (4a) is provided with a step portion (10) adjacent through-hole (8). The provision of the step portion (10) ensures an enlarged clearance between the through-hole (8) and the external auditory meatus wall to permit the user to hear voice passing through the through-hole (8) better.

Embodiment 3

Figure 3:
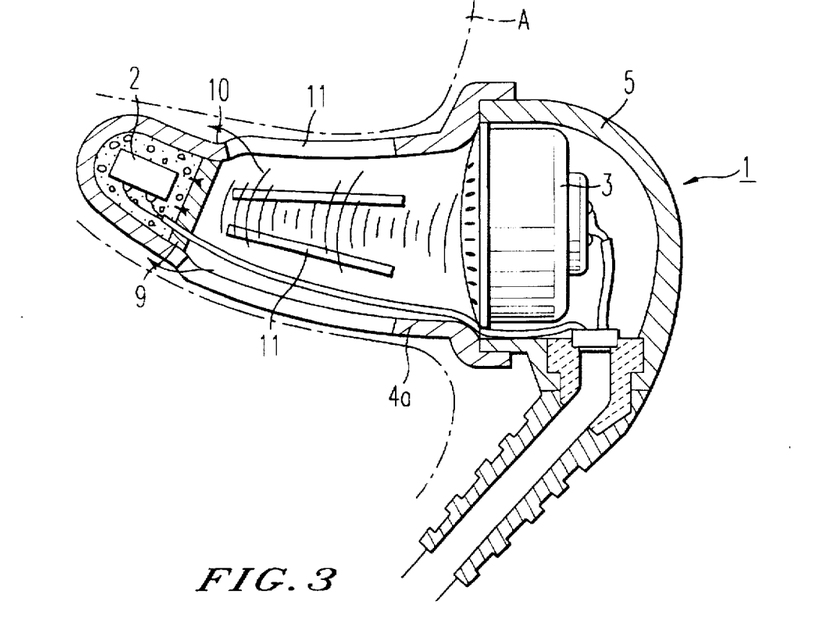
FIG. 3 is a schematic view showing the construction of a transmitting/receiving apparatus according to Embodiment 3 of the present invention.

FIG. 3 is a schematic sectional view showing the construction of a transmitting/receiving apparatus according to Embodiment 3 of the present invention. The construction of this embodiment is basically the same as that of Embodiment 2 except that distal casing member (4b) is provided with a plurality of slits (11) serving as the through-hole (8). The provision of the slits (11) permits a greater amount of voice to be directed to the depth of the external auditory meatus.

Embodiment 4

Figure 4:
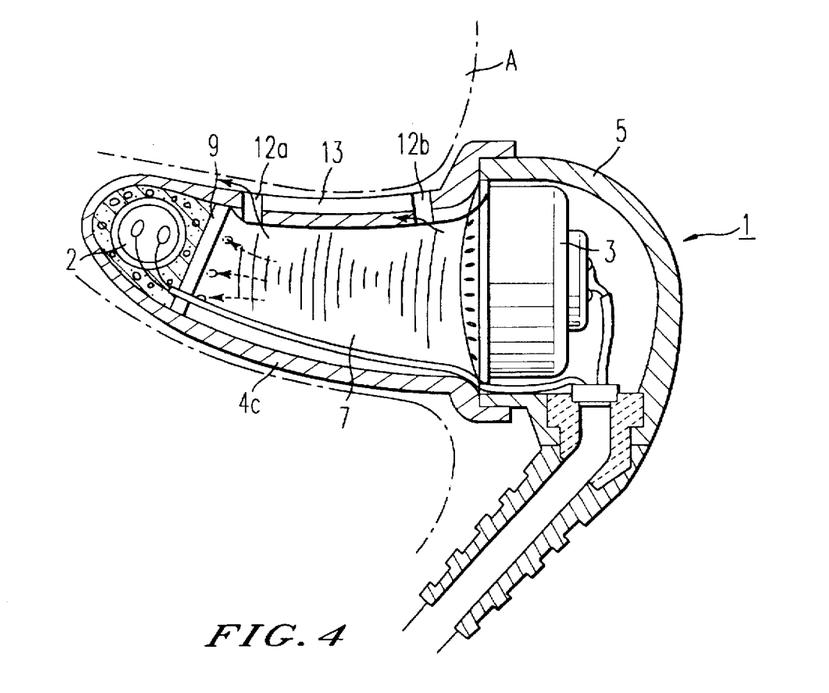
FIG. 4 is a schematic view showing the construction of a transmitting/receiving apparatus according to Embodiment 4 of the present invention.

FIG. 4 is a schematic sectional view showing the construction of a transmitting/receiving apparatus according to Embodiment 4 of the present invention. The construction of this embodiment is basically the same as that of Embodiment 1. However, this embodiment is provided with through-hole (12b) in the distal casing member (4c) on the side adjacent the base casing member (5) as well as through-hole (12a) adjacent the distal end portion. Further, a groove (13) is provided between the two through-holes (12a) and (12b).

Voice transmitted in the distal casing member (4c) is guided through the through-hole (12a) adjacent the distal end portion toward the depth of the external auditory meatus as in Embodiment 1, as well as through the through-hole (12b) adjacent the base casing member and then along the groove (13) and directed toward the depth of the external auditory meatus from a location adjacent the through-hole (12a).

Figures 5, 6:
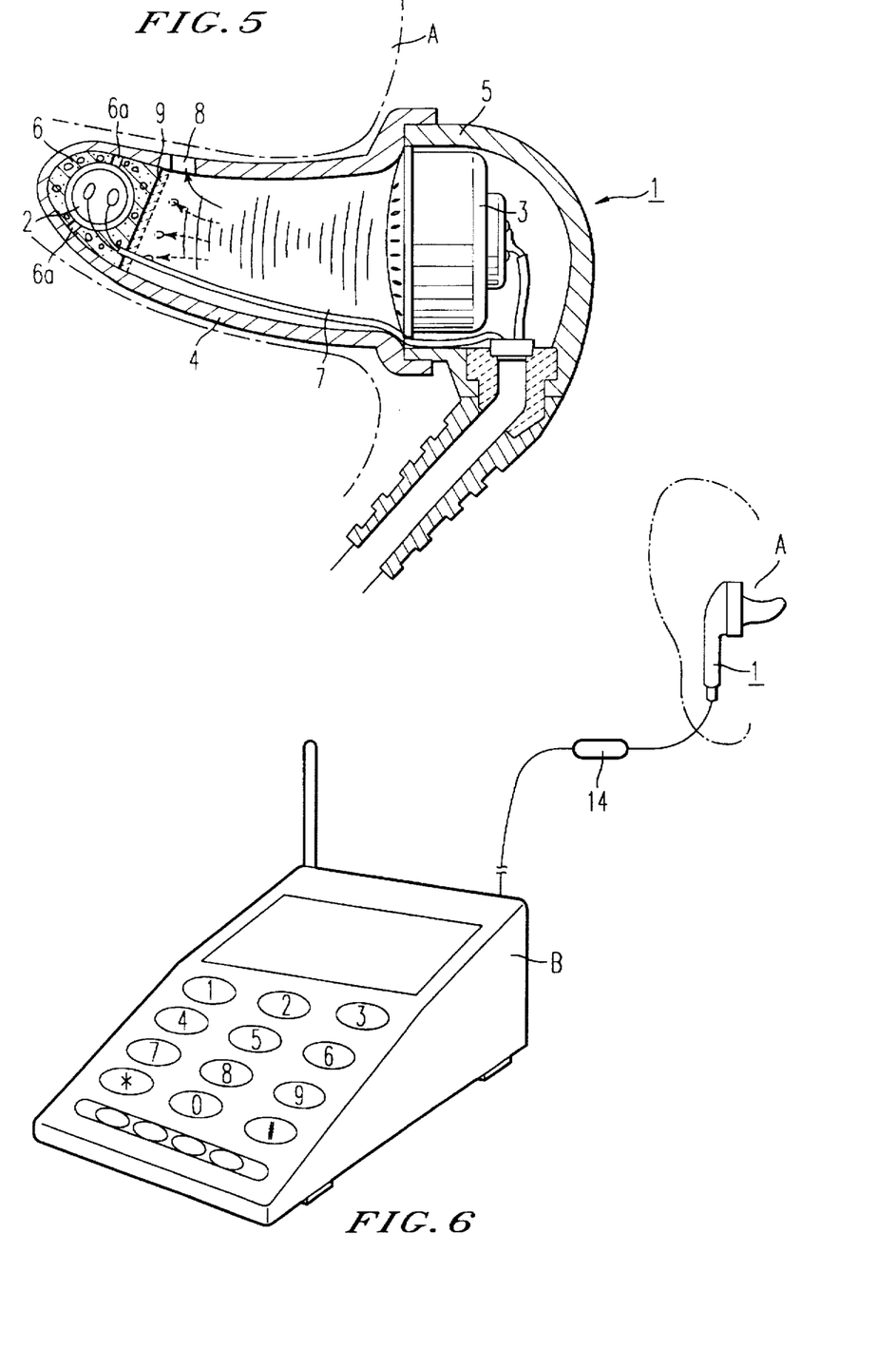
FIG. 5 is a schematic view showing the construction of a transmitting/receiving apparatus in which a vacant space is provided within a foamed material.
FIG. 6 is a schematic view showing the construction of a communication system including a common telephone apparatus according to Embodiment 5 of the present invention.

It should be noted that although the foamed material (6) is disposed to completely cover the bone-conduction microphone (2) in each of the foregoing embodiments, the foamed material (6) may have a vacant space (6a) extending between the bone-conduction microphone (2) and the casing (4) as seen in FIG. 5.

Embodiment 5

The present embodiment is a communication system including the transmitting/receiving apparatus of the present invention, the construction of which is shown in FIG. 6. The communication system includes a typical small-size telephone apparatus (B) connected to the transmitting/receiving apparatus (1) according to Embodiment (1), and an ON-OFF changeover switch (14). With this embodiment, if the transmitting/receiving apparatus (1) is fitted into an ear (A), the user is not required to carry the telephone apparatus with his one hand to talk with the communication partner and hence is capable of freely use his both hands. Further, this communication system allows the user to enjoy clear conversation with the communication partner even in a noisy atmosphere. Furthermore, since there is no need to provide a handset as large as in a conventional telephone, the telephone apparatus for use in the embodiment can be extremely reduced in size.

Embodiment 6

Figure 7:
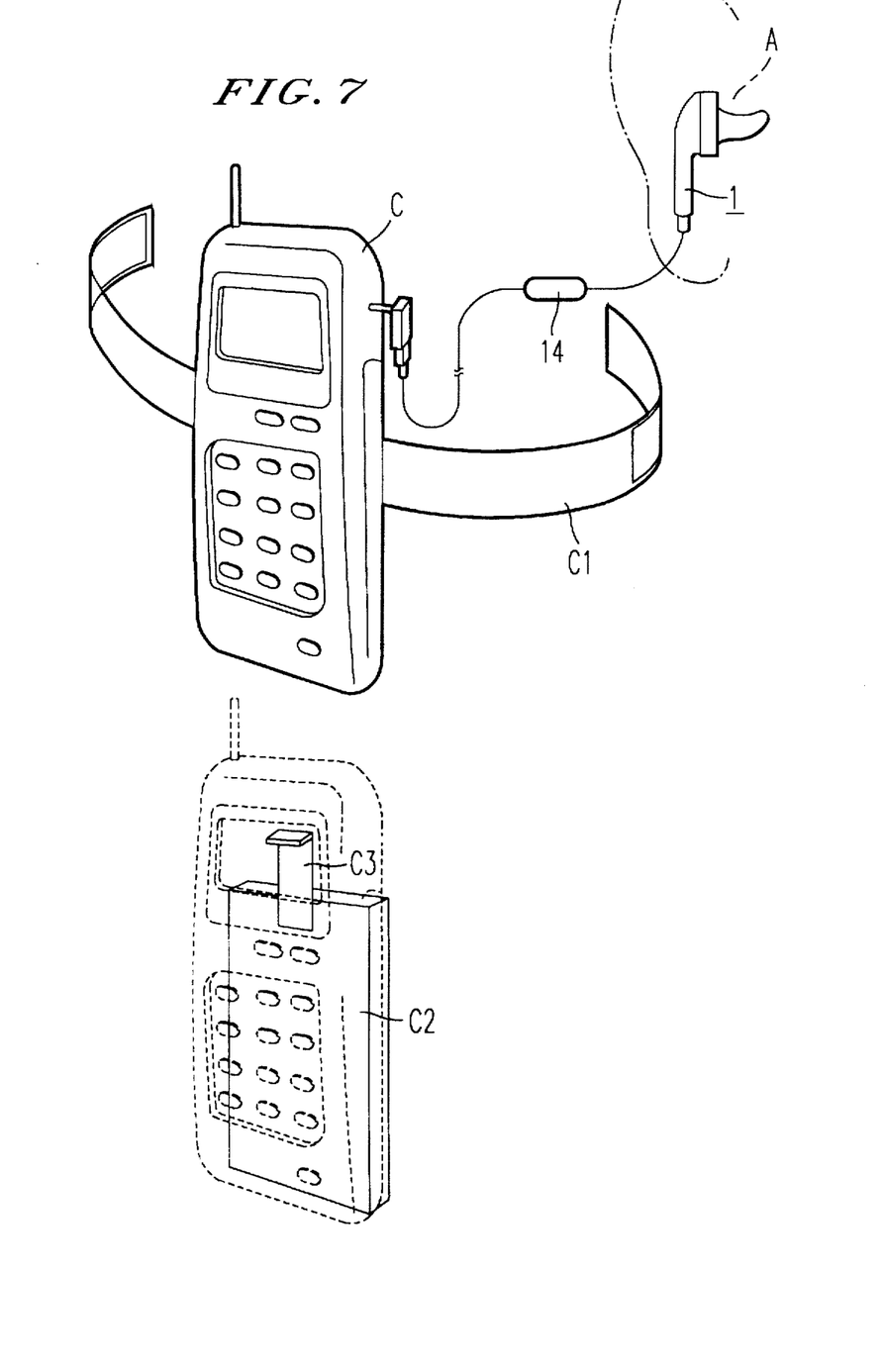
FIG. 7 is a schematic view showing the construction of a communication system including a portable telephone apparatus according to Embodiment 6 of the present invention.

The present embodiment is a communication system including the transmitting/receiving apparatus of the present invention, the construction of which is shown in FIG. 7. The communication system includes a small-size portable telephone apparatus (C) connected to the transmitting/receiving apparatus (1) according to Embodiment (1), a wrist band (C1), a battery (C2), and a pocket hook (C3). With this embodiment, the user can talk with the communication partner with the portable telephone apparatus (C) attached to his arm or waist by the wrist band (C1) or pocket hook (C3) and hence is capable of enjoying conversation with the communication partner even during walking. Further, since there is no need to utter voice through vocal cords, the user can talk with the communication partner with whispering voice. Hence, the use of this communication system in a train, a restaurant or the like causes little nuisance to other people around the user.

Further, portable telephone (C) in a conventional system is difficult to reduce in size since the speaker and microphone thereof have to be positioned adjacent an ear and mouth, respectively, of the user. With the present embodiment, however, the microphone and speaker are not required to be installed in the body of the portable telephone apparatus (C). This makes it possible to realize an ultracompact portable telephone apparatus.

Embodiment 7

Figure 8:
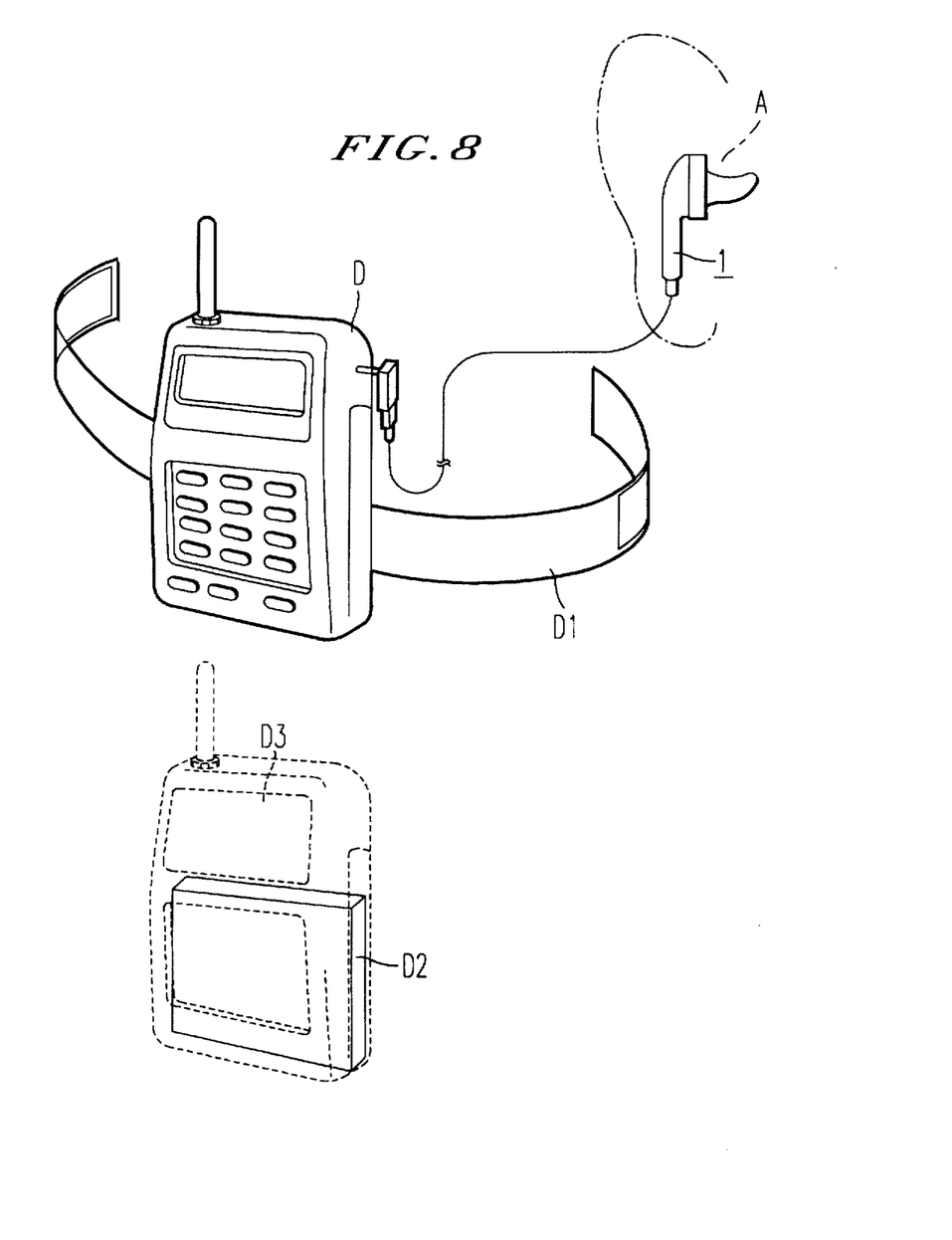
FIG. 8 is a schematic view showing the construction of a communication system including a personal handy phone apparatus according to Embodiment 6 of the present invention.

The present embodiment is a communication system including the transmitting/receiving apparatus of the present invention, the construction of which is shown in FIG. 8. The communication system includes a small-size personal handy phone apparatus (D) connected to the transmitting/receiving apparatus (1) according to Embodiment (1), a wrist band (D1), a battery (D2), and a pocket hook (D3). This embodiment enjoys the same effects as those of Embodiment 6.

Embodiment 8

Figure 9A:
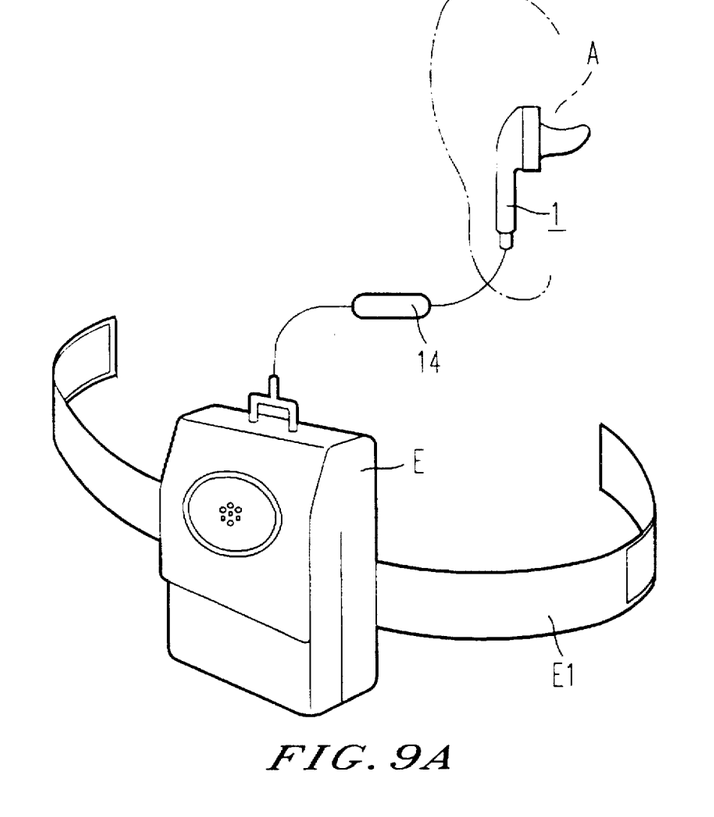
FIGS. 9A and 9B are a schematic view showing the construction of a communication system including an ear microphone/speaker for medical use according to Embodiment 8 of the present invention.
Figure 9B:
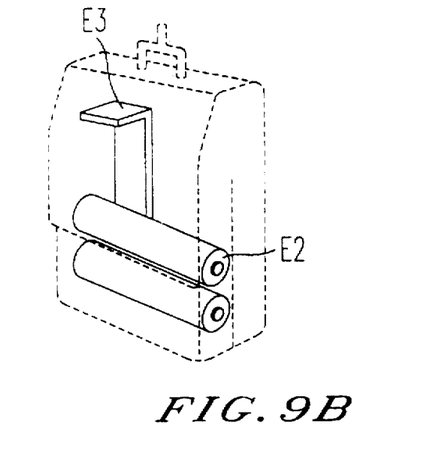

The present embodiment is a communication system including the transmitting/receiving apparatus of the present invention, the construction of which is shown in FIG. 9. The communication system includes a small-size ear microphone-speaker (E) for medical use connected to the transmitting/receiving apparatus (1) according to Embodiment (1), a wrist band (E1), a battery (E2), and a pocket hook (E3).

This embodiment is possible to be used as a communication aid for a handicapped person, for example, whose vocal cords have been removed by surgery. Alternatively, if the transmitting/receiving apparatus (1) of this communication system is attached to a patient hospitalized in an isolated room such as an intensive care unit with the main body of the ear microphone-speaker (E) being placed outside the intensive care unit, the patient is possible to enjoy a clear and smooth conversation with a visitor or medical staff who is present outside or inside the intensive care unit.

It should be understood that although the transmitting/receiving apparatus is connected to the main body of the telephone apparatus or a like apparatus through a wire in each of Embodiments 5 to 8, the communication system of the present invention can be modified into a wireless-type communication system. Such a wireless-type communication system provides the user with more enhanced handiness because of no restriction by a wire.

As has been described, the present invention provides a transmitting receiving apparatus including a bone-conduction microphone and a speaker in a single casing, which apparatus ensures less inclusion of noise and less possibility of howling and allows the user to hear the voice of the communication partner clearly. The present invention further provides an ultracompact communication system using the transmitting/receiving apparatus.

While only certain presently preferred embodiments have been described in detail, as will be apparent with those skilled in the art that certain changes and modifications can be made in embodiments without departing from the spirit and scope of the invention as defined by the following claims.

What is claimed is:

1. A transmitting/receiving apparatus fitted into an external auditory meatus comprising: a bone-conduction microphone and a speaker which are housed in a single casing, the casing having a distal end portion positioned in the external auditory meatus; wherein the bone-conduction microphone is disposed at the distal end portion and is completely surrounded by and embedded within a mass of vibration-absorptive foamed material; a hollow portion provided between the foamed material and the speaker within the casing; and a through-hole extending through a wall portion of the casing at a location adjacent the distal end portion.

2. The apparatus as set forth in claim 1, wherein the casing is provided with a step portion which reduces the size of the distal end portion and which defines the through-hole.

3. The apparatus as set forth in claim 2, further comprising a sound insulating member disposed between the hollow portion and the foamed material.

4. A communication system comprising the main body, and the transmitting/receiving apparatus as recited in claim 2.

5. The communication system as set forth in claim 4, wherein the main body and the transmitting/receiving apparatus transmit electric signals to each other in a wireless manner.

6. The apparatus as set forth in claim 1, further comprising a sound insulating member disposed between the hollow portion and the foamed material.

7. A communication system comprising a main body, and the transmitting/receiving apparatus as recited in claim 6.

8. The communication system as set forth in claim 7, wherein the main body and the transmitting/receiving apparatus transmit electric signals to each other in a wireless manner.

9. A communication system comprising the main body, and the transmitting/receiving apparatus as recited in claim 1.

10. The communication system as set forth in claim 9, wherein the main body and the transmitting/receiving apparatus transmit electric signals to each other in a wireless manner.

11. A transmitting/receiving apparatus fitted into an external auditory meatus comprising: a bone-conduction microphone and a speaker which are housed in a single casing, the casing having a distal end portion positioned in the external auditory meatus; wherein the bone-conduction microphone is disposed at the distal end portion and is completely surrounded by and embedded within a mass of vibration-absorptive foamed material; a hollow portion provided between the foamed material and the speaker within the casing; a first through-hole extending through a wall portion of the casing at the hollow portion adjacent the distal end portion; a second through-hole extending through a wall portion of the casing at the hollow portion adjacent the speaker; and a groove portion formed in an outer surface of the casing between the first and second through-holes.

12. The apparatus as set forth in claim 11, further comprising a sound insulating member disposed between the hollow portion and the foamed material.

13. A communication system comprising a main body, and the transmitting/receiving apparatus as recited in claim 11.

14. The communication system as set forth in claim 13, wherein the main body and the transmitting/receiving apparatus transmit electric signals to each other in a wireless manner.

* * * * *